US007110940B2

(12) United States Patent
Smith et al.

(10) Patent No.: US 7,110,940 B2
(45) Date of Patent: Sep. 19, 2006

(54) RECURSIVE MULTISTAGE AUDIO PROCESSING

(75) Inventors: Derek H. Smith, Bothell, WA (US); Brian L. Schmidt, Bellevue, WA (US); Georgios Chrysanthakopoulos, Redmond, WA (US)

(73) Assignee: Microsoft Corporation, Redmond, WA (US)

(*) Notice: Subject to any disclaimer, the term of this patent is extended or adjusted under 35 U.S.C. 154(b) by 925 days.

(21) Appl. No.: 10/284,854

(22) Filed: Oct. 30, 2002

(65) Prior Publication Data

US 2004/0088169 A1 May 6, 2004

(51) Int. Cl.
*G10L 21/00* (2006.01)
*G06F 3/16* (2006.01)

(52) U.S. Cl. ...................................... 704/200; 704/503

(58) Field of Classification Search .................... None
See application file for complete search history.

(56) References Cited

U.S. PATENT DOCUMENTS

| | | | | |
|---|---|---|---|---|
| 3,872,293 A * | 3/1975 | Green | | 708/821 |
| 5,541,354 A | 7/1996 | Farrett et al. | | 84/603 |
| 6,180,312 B1 * | 1/2001 | Edwards | | 430/140 |
| 6,658,578 B1 * | 12/2003 | Laurenti et al. | | 713/324 |
| 2003/0144838 A1 * | 7/2003 | Allegro | | 704/233 |
| 2006/0015585 A1 * | 1/2006 | Okada | | 709/219 |

FOREIGN PATENT DOCUMENTS

WO WO 99/35009 7/1999

OTHER PUBLICATIONS

Bell, Eric W. 2001. Creawiare Audio Powersampler 2.03 (Mac/Win). *Electrician Musician.* (Mar.): 17:3; 144. (6pp) Available http://asp.nerac.com/caccess/WNDABSM?SESSION=D77697D3003C6332&ndn=102024322373&topic.

Grant, Rick. 2000. Applied Technology; Lighthouse Digital Systems OZ TDM Audio Router. *Broadcast Engineering.* (Jun.). (4pp) Available http://asp.nerac.com/caccess/WNDABSM?SESSION=D77697D3003C6332&ndn=102022813780&topic.

Amphlett, R.W. and D. R. Bull. 1995. Multiprocessor Scheduling for High Quality Digital Audio. *IEE Colloquium.* (1pg). Available http://asp.nerac.com/caccess/WNDABSM?SESSION=D77697D3003C6332&ndn=017023734867&topic.

* cited by examiner

*Primary Examiner*—David D. Knepper
(74) *Attorney, Agent, or Firm*—Ronald M. Anderson

(57) ABSTRACT

Efficient recursive audio processing of one or more input data streams using a multistage processor for performing one or more predetermined functions and programmable audio effects. A first stage performs a first predetermined function, such as frequency shifting function. Intermediate results are preferably mixed. The second stage applies programmable audio effects to the mixed data, such as a reverberation effect, and stores the second stage output in a destination mix bin. The second stage output is preferably transferred to a main memory accessible to a primary processor. The second stage output is directed back to the first stage of the multistage processor to perform a second predetermined function, such as three dimensional spatialization. The primary processor modifies parameters of the first predetermined function to efficiently perform dynamic operations, such as Doppler shifts and volume transitions between multiple sound sources and a mixture of those sounds as a single point source.

20 Claims, 7 Drawing Sheets

RECURSIVE MULTISTAGE AUDIO PROCESSING

FIELD OF THE INVENTION

The present invention generally relates to audio processing in a game console; and more specifically, pertains to recursively processing audio data through a multistage processor.

BACKGROUND OF THE INVENTION

Many electronic devices include both a primary and a secondary processor. The primary processor is typically used to perform core functions of the electronic device. The secondary processor performs other functions, such as media processing, math co-processing, and other specialized functions, freeing the primary processor from such tasks. Typically, the hardware structure of the secondary processor is optimized to perform the desired specialized functions. For example, an audio processor may have a pipeline stage architecture that performs one or more predetermined functions on a stream of input audio data prior to applying programmable audio effects to the audio data.

A pipelined stage architecture is efficient for processing a stream of data, but may be inefficient for multiple streams of data. For instance, in performing a predetermined three-dimensional (3D) audio spatialization function on a single input data stream, an audio processor produces multiple outputs corresponding to multiple speakers (e.g., five speakers). Each of the multiple outputs is stored in local memory of the secondary processor at a separate location (sometimes referred to as a mix bin). The audio processor can then apply a programmable audio effect, such as reverberation, to the data passing through each mix bin. However, there is typically more than a single input data stream that must be processed for 3D audio spatialization. Thus, the total number of mix bins required to process 3D output data would be equal to the product of the number of input streams multiplied by the number of speakers. Unfortunately, the number of mix bins is usually limited on a secondary processor. Also, the same programmable audio effects are typically applied to each of the multiple outputs of the predetermined functions. Thus, a conventional use of a pipelined stage architecture results in inefficient processing of multiple input data streams.

It would be desirable to use the pipelined stage architecture for such audio processing, because of the low cost of the secondary processors. However, a technique is needed to improve the processing efficiency of secondary processors having one or more input data streams. It would also be desirable to modify parameters of one or more of the predetermined functions in relation to the output of the programmable audio effects. Another desirable objective would be to enable reprocessing of an output from the programmable audio effects through one or more of the predetermined functions.

SUMMARY OF THE INVENTION

The present invention provides a method and system for efficient recursive audio processing of one or more input data streams using a multistage processor capable of performing one or more predetermined functions and programmable audio effects. Preferably, the multistage processor comprises at least one digital signal processor. The input data streams are provided to a first stage of the multistage processor, which performs a first predetermined function, such as an enveloping function or a frequency shifting function. An intermediate result for each data stream is preferably mixed and stored in a memory location that is accessible to a second stage of the multistage processor. The second stage applies programmable audio effects to the mixed data, such as a reverberation effect, and stores the second stage output in a memory location that is accessible to the first stage of the multistage processor. The first stage then performs a second predetermined function, such as 3D spatialization, on the second stage output to produce one or more output audio signals. The output audio signals are preferably used to drive one or more corresponding speakers directly or via a network to other sound transducers.

Another aspect of the invention involves a primary processor that is substantially independent of the multistage processor. Preferably, the second stage output data is stored in a destination mix bin that is dedicated to the multistage processor, but is mapped to a portion of a main memory that is accessible to the primary processor. The second stage output data is transferred to the portion of the main memory. The second stage output can then become a unique input data stream back into the first stage of the multistage processor. This enables the first stage to then perform the second predefined function on the second stage output data. This recursion provides for very efficient processing by the multistage processor. The primary processor may further modify one or more parameters of the first predetermined function to adjust the processing of the original input data streams. Such adjustments enable the multistage processor to efficiently perform dynamic operations, such as Doppler shifts and volume transitions between multiple sound sources and a mixture of those sounds into a single point source. A further aspect of the invention is a memory medium storing machine instructions for carrying out the steps described above, and described in further detail below.

BRIEF DESCRIPTION OF THE DRAWING FIGURES

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

A preferred embodiment of the present invention is described below in regard to an exemplary use in providing audio for an electronic gaming system that is designed to execute gaming software distributed on a portable, removable medium. Those skilled in the art will recognize that the present invention may also be implemented in other computing devices, such as a set-top box, an arcade game, a hand-held device, an effects processor module for use in a sound system, and other related systems. It should also be apparent that the present invention may be practiced on a single machine, such as a single personal computer, or practiced in a network environment, with multiple consoles or computing devices interconnected to each other and/or with one or more server computers.

Exemplary Operating Enviroment

Figure 1:
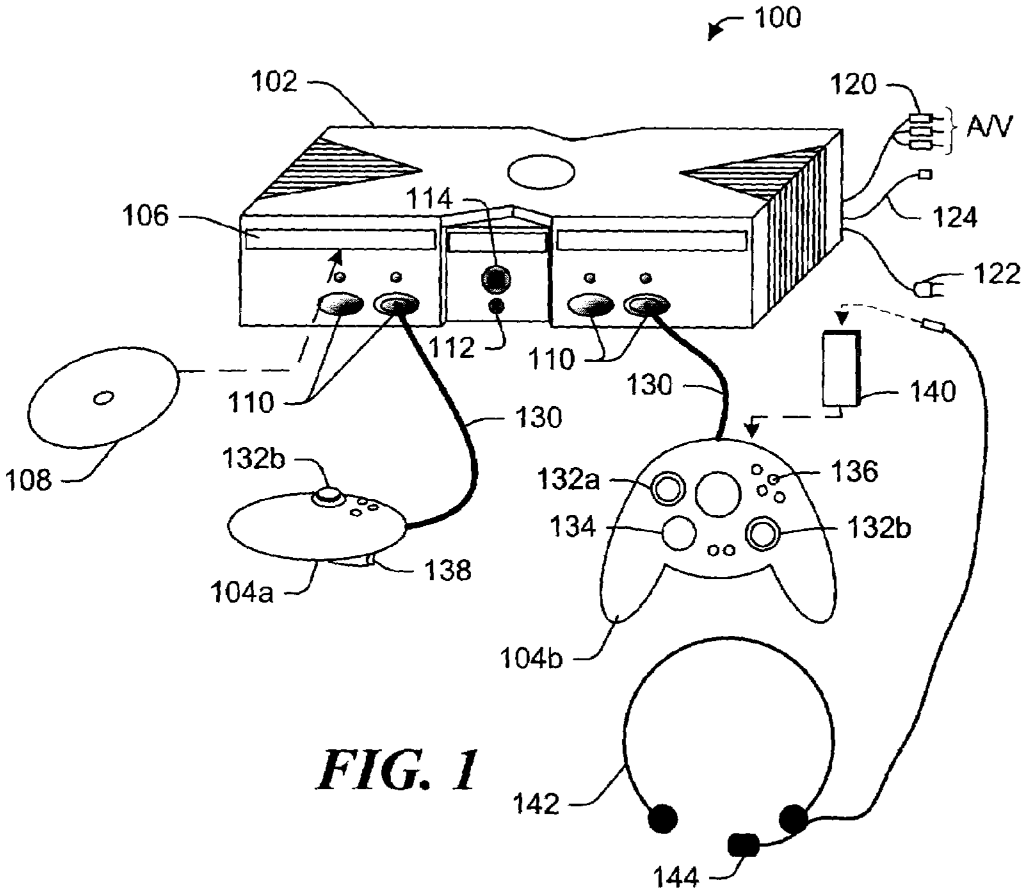
FIG. 1 illustrates an exemplary electronic gaming system that includes a game console and support for up to four user input devices.

As shown in FIG. 1, an exemplary electronic gaming system 100 in which the present invention is practiced includes a game console 102 and support for up to four user input devices, such as controllers 104*a* and 104*b*. Game console 102 is equipped with an internal hard disk drive (not shown in this Figure) and a portable media drive 106 that supports various forms of portable optical storage media, as represented by an optical storage disc 108. Examples of suitable portable storage media include DVD discs and CD-ROM discs. In this gaming system, game programs are preferably distributed for use with the game console on DVD discs, but it is also contemplated that other storage media might instead be used on this or other types of systems that employ the present invention.

On a front face of game console 102 are four ports 110 for connection to supported controllers, although the number and arrangement of ports may be modified. A power button 112, and an eject button 114 are also disposed on the front face of game console 102. Power button 112 controls application of electrical power to the game console, and eject button 114 alternately opens and closes a tray (not shown) of portable media drive 106 to enable insertion and extraction of storage disc 108, so that the digital data on the disc can be read for use by the game console.

Game console 102 connects to a television or other display monitor or screen (not shown) via audio/visual (A/V) interface cables 120. A power cable plug 122 conveys electrical power to the game console when connected to a conventional alternating current line source (not shown). Game console 102 includes an Ethernet data connector 124 to transfer and receive data over a network (e.g., through a peer-to-peer link to another game console or through a connection to a hub or a switch—not shown), or over the Internet, for example, through a connection to an xDSL interface, a cable modem, or other broadband interface (not shown). Other types of game consoles may be coupled together in communication using a conventional telephone modem.

Each controller 104*a* and 104*b* is coupled to game console 102 via a lead (or alternatively, through a wireless interface). In the illustrated implementation, the controllers are universal serial bus (USB) compatible and are connected to game console 102 via USB cables 130. Game console 102 may be equipped with any of a wide variety of user interface devices for interacting with and controlling the game software. As illustrated in FIG. 1, each controller 104*a* and 104*b* is equipped with two thumbsticks 132*a* and 132*b*, a D-pad 134, buttons 136, and two triggers 138. These controllers are merely representative, and other gaming input and control devices may be substituted for or added to those shown in FIG. 1 for use with game console 102.

A removable function unit 140 can optionally be inserted into controller 104 to provide additional features and functions. For example, a portable memory unit (MU) enables users to store game parameters and port them for play on other game consoles, by inserting the portable MU into a controller connected to the other game console. Another removable functional unit comprises a voice communication unit that enables a user to verbally communicate with other users locally and/or over a network. Connected to the voice communication unit is a headset 142, which includes a boom microphone 144. In the described implementation, each controller is configured to accommodate two removable function units, although more or fewer than two removable function units or modules may instead be employed.

Gaming system 100 is capable of playing, for example, games, music, and videos. It is contemplated that other functions can be implemented using digital data stored on the hard disk drive or read from optical storage disc 108 in drive 106, or using digital data obtained from an online source, or from the MU. For example, gaming system 100 is capable of playing:

- Game titles stored on CD and DVD discs, on the hard disk drive, or downloaded from an online source;
- Digital music stored on a CD in portable media drive 106, in a file on the hard disk drive (e.g., Windows Media Audio™ (WMA) format), or derived from online streaming sources on the Internet or other network; and
- Digital AV data such as movies that are stored on a DVD disc in portable media drive 106, or in a file on the hard disk drive (e.g., in an Active Streaming Format), or from online streaming sources on the Internet or other network.

Figure 2:
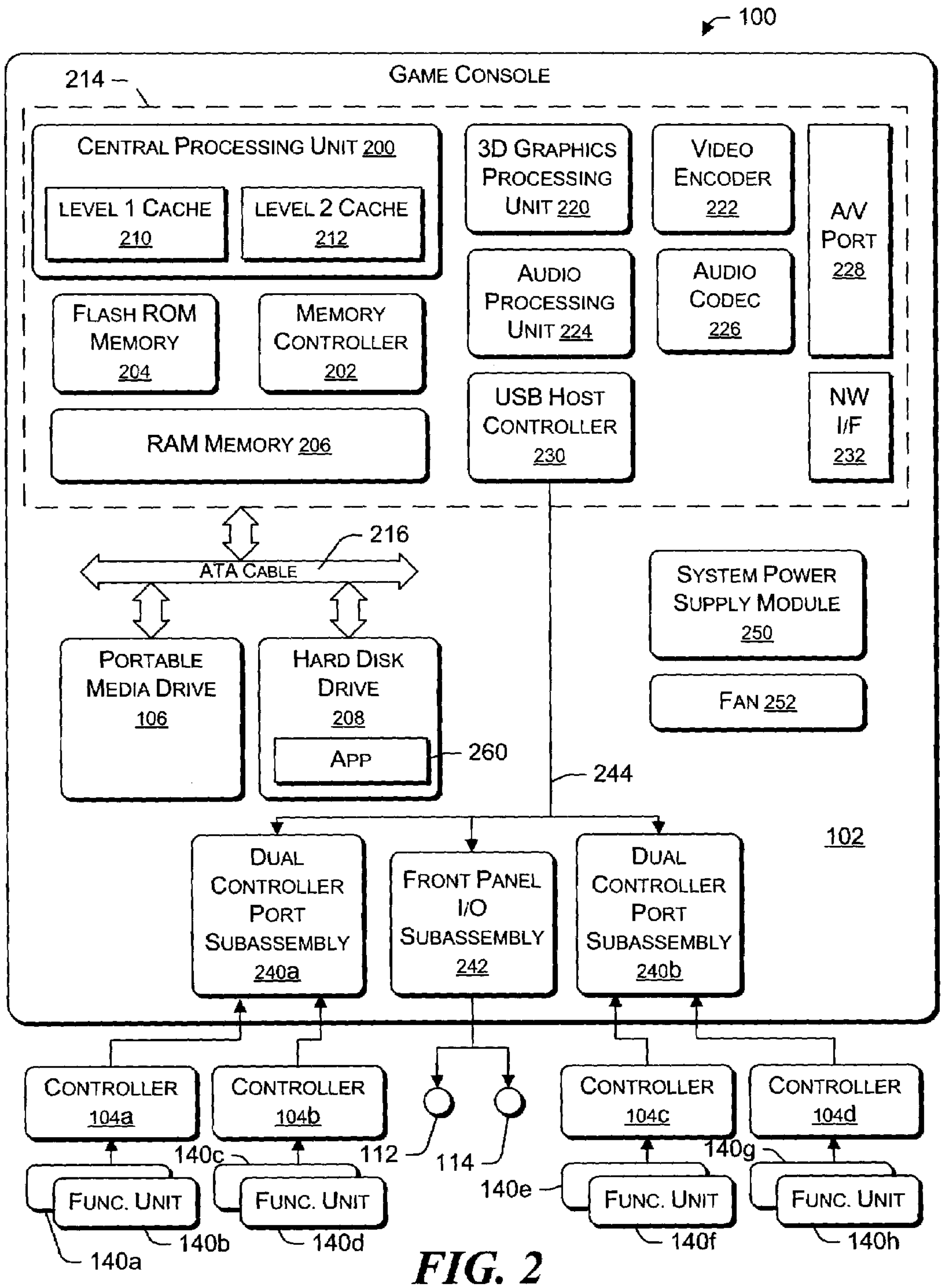
FIG. 2 is a functional block diagram showing components of the gaming system in greater detail.

FIG. 2 shows functional components of gaming system 100 in greater detail. Game console 102 includes a central processing unit (CPU) 200, and a memory controller 202 that facilitate processor access to a read-only memory (ROM) 204, a random access memory (RAM) 206, a hard disk drive 208, and portable media drive 106. CPU 200 is equipped with a level 1 cache 210 and a level 2 cache 212 to temporarily store data so as to reduce the number of memory access cycles required, thereby improving processing speed and throughput. CPU 200, memory controller 202, and various memory devices are interconnected via one or more buses, including serial and parallel buses, a memory bus, a peripheral bus, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnect (PCI) bus.

As an example of one suitable implementation, CPU 200, memory controller 202, ROM 204, and RAM 206 are integrated into a module 214. In this implementation, ROM 204 is configured as a flash ROM that is connected to memory controller 202 via a PCI bus and a ROM bus (neither of which are shown). RAM 206 is configured as multiple Double Data Rate Synchronous Dynamic RAMs (DDR SDRAMs) that are independently controlled by memory controller 202 via separate buses (not shown). Hard disk drive 208 and portable media drive 106 are connected to the memory controller via the PCI bus and an Advanced Technology Attachment (ATA) bus 216.

A three-dimensional (3D) graphics processing unit (GPU) 220 and a video encoder 222 form a video processing pipeline for high-speed and high-resolution graphics processing. Data are carried from GPU 220 to video encoder 222 via a digital video bus (not shown). An audio processing unit 224 and an audio encoder/decoder (CODEC) 226 form a corresponding audio processing pipeline for high fidelity and stereo audio data processing. Audio data are carried between audio processing unit 224 and audio CODEC 226 via a communication link (not shown). The video and audio processing pipelines output data to an A/V port 228 for transmission to the television or other display monitor. In the illustrated implementation, video and audio processing components 220–228 are mounted on module 214.

Also implemented by module 214 are a USB host controller 230 and a network interface 232. USB host controller 230 is coupled to CPU 200 and memory controller 202 via a bus (e.g., the PCI bus), and serves as a host for peripheral controllers 104*a*–104*d*. Network interface 232 provides access to a network (e.g., the Internet, home network, etc.) and may be any of a wide variety of various wire or wireless interface components, including an Ethernet card, a telephone modem interface, a Bluetooth module, a cable modem interface, an xDSL interface, and the like.

Game console 102 has two dual controller support subassemblies 240*a* and 240*b*, with each subassembly supporting two of game controllers 104*a*–104*d*. A front panel I/O subassembly 242 supports the functionality of power button 112 and eject button 114, as well as any light-emitting diodes (LEDs) or other indicators exposed on the outer surface of the game console. Subassemblies 240*a*, 240*b*, and 242 are coupled to module 214 via one or more cable assemblies 244.

Eight function units 140*a*–140*h* are illustrated as being connectable to four controllers 104*a*–104*d*, i.e., two function units for each controller. Each function unit 140 offers additional features, or memory in which games, game parameters, and other data may be stored. When an MU is inserted into a controller, the MU can be accessed by memory controller 202. A system power supply module 250 provides power to the components of gaming system 100. A fan 252 cools the components and circuitry within game console 102.

To implement the present invention, a game software application 260 comprising machine instructions stored on a DVD or other storage media (or downloaded over the network) is loaded into RAM 206 and/or caches 210 and 212 for execution by CPU 200. Portions of software application 260 may be loaded into RAM only when needed, or all of the software application (depending on its size) may be loaded into RAM 206. Software application 260 (typical) is described below in greater detail.

Gaming system 100 may be operated as a stand-alone system by simply connecting the system to a television or other display monitor. In this standalone mode, gaming system 100 enables one or more users to play games, watch movies, or listen to music. However, when connected to the Internet or other network, which is made available through network interface 232, gaming system 100 may interact with another gaming system or operate as a component of a larger network gaming community, to enable participation in multiplayer games that are played over the Internet or other network and with players who are using other similar gaming systems.

Network System

Figure 3:
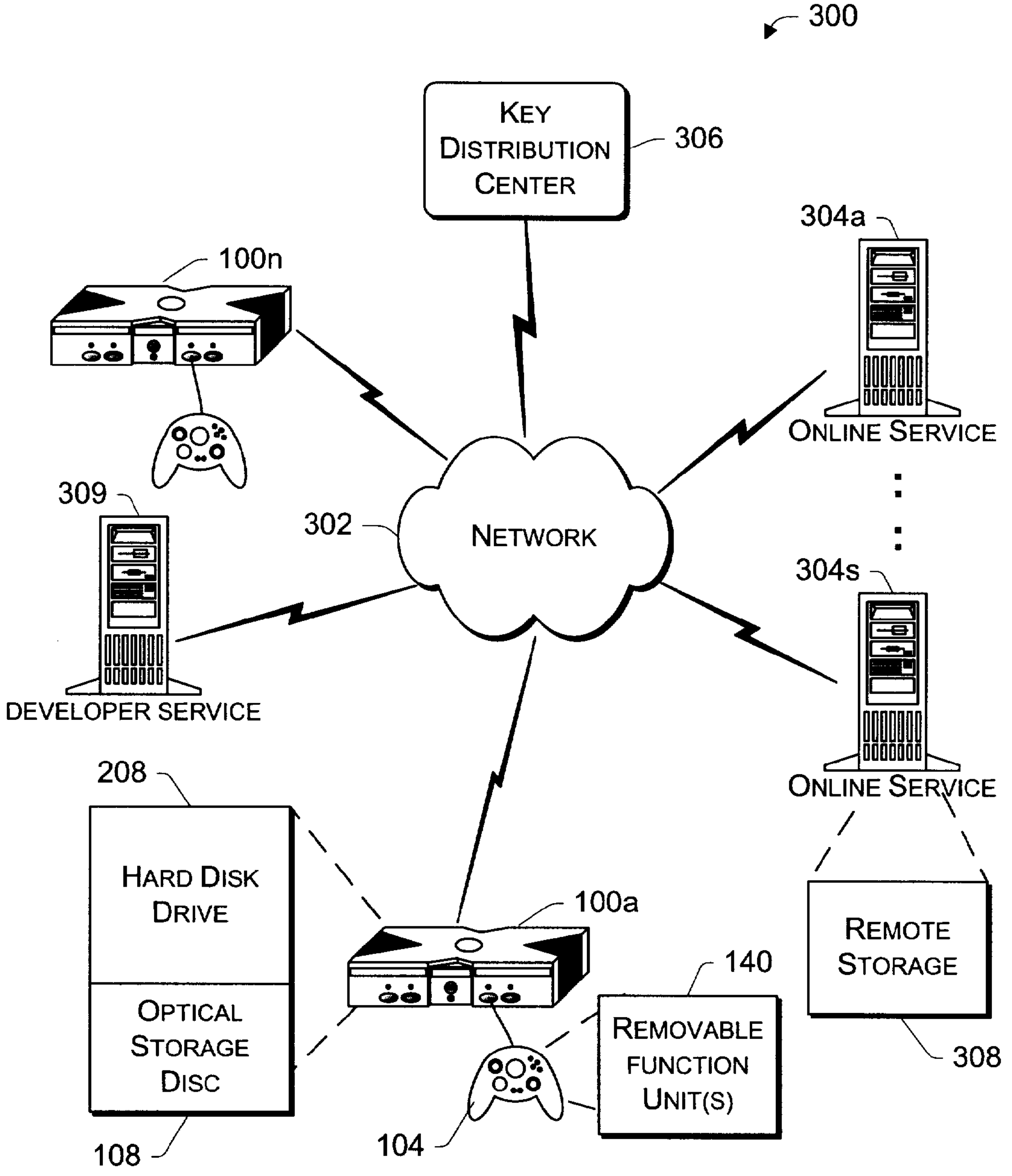
FIG. 3 shows an exemplary network gaming environment that interconnects multiple gaming systems via a network.

FIG. 3 shows an exemplary network gaming environment 300 that interconnects multiple gaming systems 100*a*, . . . 100*n* via a network 302. Network 302 represents any of a wide variety of data communications networks and may include public portions (e.g., the Internet), as well as private portions (e.g., a private LAN). Network 302 may be implemented using any one or more of a wide variety of conventional communications configurations including both wired and wireless types. Any of a wide variety of communications protocols can be used to communicate data via network 302, including both public and proprietary protocols. Examples of such protocols include TCP/IP, IPX/SPX, NetBEUI, etc.

In addition to gaming system 100, one or more online services 304*a*, . . . 304*s* are accessible via network 302 to provide various services for the participants, such as serving and/or hosting online games. It is contemplated that the online services might also be set up for serving downloadable music or video files, hosting gaming competitions, serving streaming A/V files, enabling exchange of email or other media communications, and the like. Network gaming environment 300 may further employ a key distribution center 306 for authenticating individual players and/or gaming systems 100 for interconnection to one another as well as to online services 304*a*, . . . 304*s*. Distribution center 306 distributes keys and service tickets to valid participants that may then be used to form game playing groups including multiple players, or to purchase services from online services 304*a*, . . . 304*s*.

Network gaming environment 300 introduces another memory source available to individual gaming systems 100, i.e., online storage. In addition to optical storage disc 108, hard disk drive 208, and MUs, gaming system 100*a* can also access data files available at remote storage locations via network 302, as exemplified by remote storage 308 at online service 304*s*.

Network gaming environment 300 further includes a developer service 309 that is used by developers when producing media effects, updated media data, game code, and to provide other services. Such services can be distributed between the online services and the gaming systems, and between other devices within, and outside of network gaming environment 300.

Exemplary Media Processing System and Audio Configuration

Figure 4:
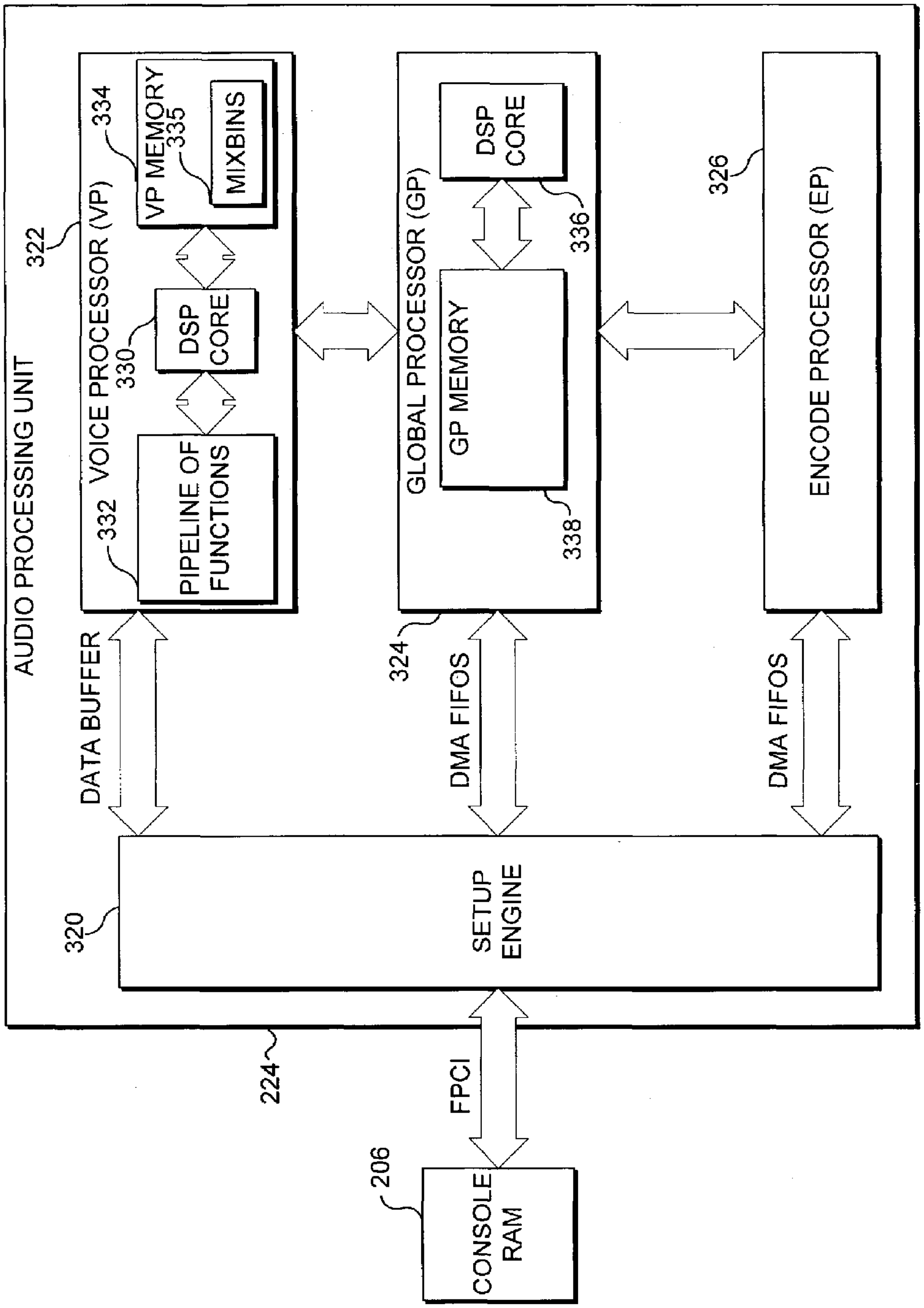
FIG. 4 is a functional block diagram preferred architecture regarding an audio processing unit of the gaming console.

FIG. 4 illustrates a preferred architecture of audio processing unit 224 for recursively operating on audio data. The audio processing unit includes a setup engine 320 that is responsible for controlling access between console RAM 206 and processors within the audio processing unit. Preferably, setup engine 320 performs direct memory access (DMA) processing to gather data from console RAM 206 and to convert the data, as necessary, to signed pulse code modulation (PCM) data, which is used by other components of the audio processing unit. Setup engine 320 also handles data addressing, including loop processing for downloadable sounds (DLS) compliance.

Setup engine 320 communicates with a voice processor (VP) 322. VP 322 is preferably a digital signal processor (DSP) operating as a first stage of audio processor 224. Specifically, VP 322 functions as a primary PCM synthesis and sub-mixing engine. VP 322 comprises a fixed function DSP core 330 that is in communication with a pipeline of programmable, but predetermined, functions 332. DSP core 330 is also in communication with a VP memory 334 that includes physical storage locations that are referred to as mix bins 335. Preferably, individual audio data sources (sometimes referred to as voices) are routed through one or more of predetermined pipeline functions 332, and the results are temporarily stored in mix bins 335 of VP memory 334.

Voice processor 322 and setup engine 320 are in communication with a global processor (GP) 324. GP 324 is another DSP that is considered a second stage of audio processor 224. Preferably, GP 324 can access physical mix bins 335 for VP output audio data. GP 324 applies programmable audio effects to the VP output audio data to create final linear PCM stereo or multi-channel output. GP 324 comprises a programmable DSP core 336 in communication with a GP memory 338. GP memory 338 preferably stores audio effect programs, audio effect data, and a DSP execution kernel. The output of GP 324 is preferably temporarily stored in physical mix bins 335 of VP memory 334.

Global processor 324 and setup engine 320 communicate with an encode processor 326. Encode processor 326 provides real time Dolby digital and Dolby surround encoding. Encode processor 326 also monitors peak and root mean square (RMS) levels for individual audio streams as well as down mix for stereo output.

In general, audio data, such as voice communication data during a software game or audio data that is part of the game program, flows to VP 322, to GP 324, to encode processor 326, and ultimately, to one or more speakers (or other sound transducers) and/or to a network. During the flow of audio data through the audio processor, one or more predetermined functions may be applied to the audio data by VP 322, and one or more audio effects may be applied to the audio data by GP 324. The resulting processed audio data are copied to console RAM 206.

Figure 5:
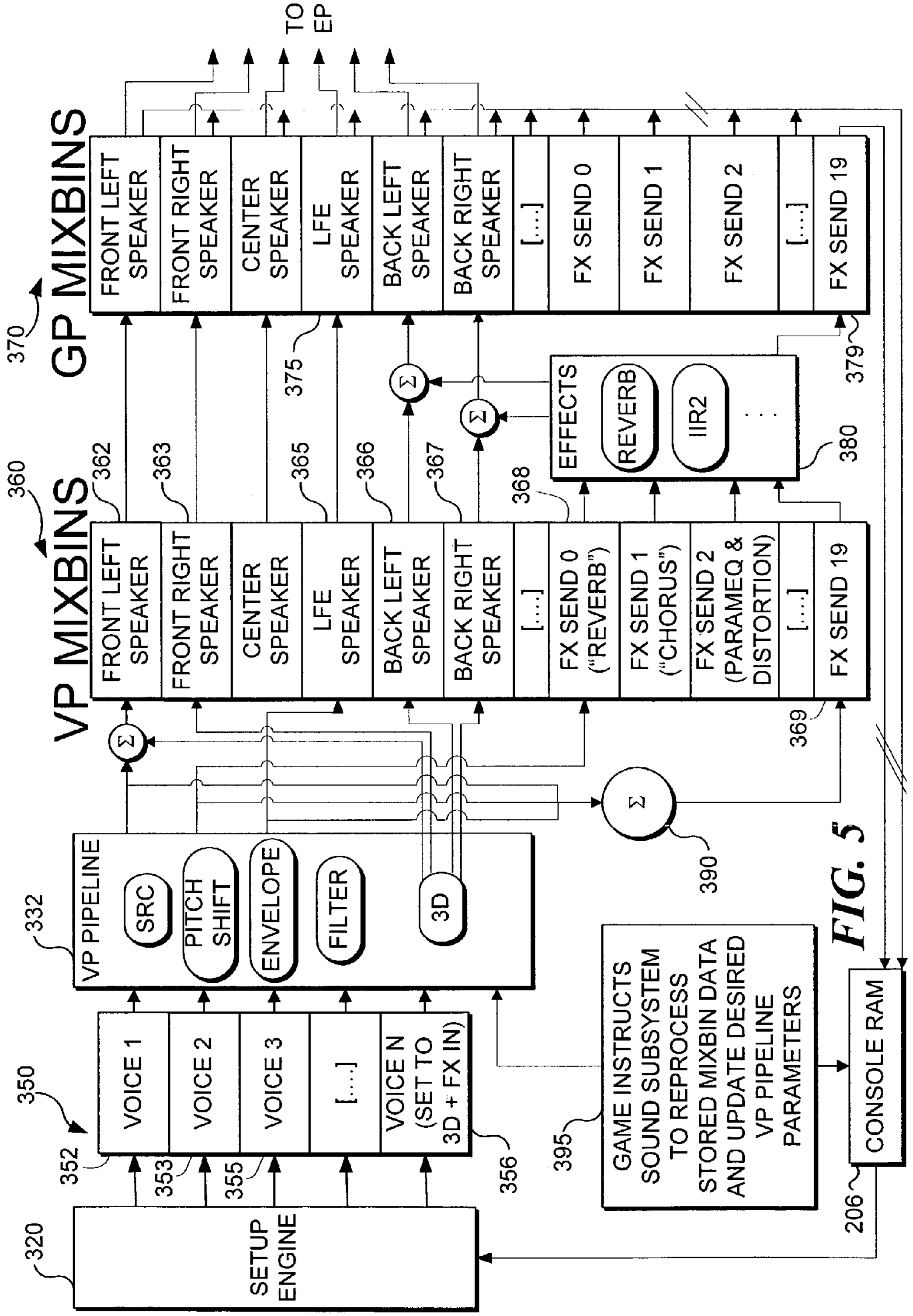
FIG. 5 is a functional block diagram showing an exemplary audio configuration for a gaming console.

FIG. 5 illustrates the logical flow described above in the form of a sample logical audio configuration for a computer game. The VP accepts PCM data from setup engine 320, i.e., audio data sources 350, which are sometimes referred to as voices. The VP sends the audio data from each audio data source through VP pipeline 332. VP pipeline 322 performs one or more predetermined functions such as sample rate conversion, pitch shifting, enveloping, filtering, and optionally, 3D audio localization. The resulting audio data are selectively routed to logical VP mix bins 360. For instance, a game developer may choose to route game audio data or live input audio data from voice one 352 through one or more predetermined functions of pipeline 332 and into a front left speaker VP mix bin 362. Similarly, audio data from a voice two 353 may be routed through one or more predetermined functions of pipeline 332 to an audio effect (FX) send zero VP mix bin 368. It will be understood that an output of pipeline 332 may also be routed to more than one of VP mix bins 360.

If the game developer wishes to process audio data through pipeline 332, but does not wish to apply any audio effect to some of the audio data, the game developer may route the selected audio data directly to one of a plurality of logical GP mix bins 370. For example, audio data from a voice three 355 may be routed through pipeline 332 to a low frequency encoding (LFE) speaker VP mix bin 365 and directly on to a corresponding LFE speaker GP mix bin 375. Preferably, logical VP mix bins 360 and logical GP mix bins 370 correspond to the same physical memory space (i.e., VP mix bins 335 of FIG. 4). Thus, a direct routing simply indicates that no change is made to the audio data associated with LFE speaker VP mix bin 365.

Alternatively, the game developer may choose to mix audio data from multiple voices. For example, audio data associated with the first three voices may correspond to sounds from a simulated vehicle, such as an engine noise, a tire skidding noise, and a noise from a weapon attached to the vehicle. The developer may wish to provide these noises individually, with separate 3D audio spatialization, when the game displays a simulated active view from within the vehicle. In addition, the developer may wish to mix these noises into a single point source in case the user of the computer simulation changes the active view to a point external to the vehicle, so that the vehicle is viewed from some distance. When the active view is from within the vehicle, each different noise, and the spatial location of each noise, will be perceptible to the user. Conversely, when the active view is outside and away from the vehicle, these different noises would be heard as a combined point source and would be perceived as being mixed together and emanating generally from the spatial location of the vehicle—not from different positions on the vehicle. To ensure quick and smooth audio transitions when the active view is changed, the separate noises and the mixed noise are preferably processed in parallel. An appropriate volume control or other control can be set to correspond to the active view, according to a distance of the viewpoint of the user relative to the vehicle, or according to another characteristic that affects the user's perception of the vehicle noises in the simulated environment of the game.

To mix audio data from multiple voices, each voice is preferably processed through one or more predetermined functions of pipeline 332 and then added together through one or more mixers. For instance, audio data from voice one 352, voice two 353, and voice three 355 may each be processed through selected predetermined functions of pipeline 332. The resulting processed audio data from each pipeline may then be added together by a logical mixer 390, and the mixed audio data may be stored in a VP FX send 19 VP mix bin 369. Those skilled in the art will recognize that a separate mixer is not required, but that mixing can be accomplished directly while writing the audio data to a mix bin.

Additional mixing and programmable audio effects may further be applied by the GP. Audio effect programs 380 are executed by the DSP core of the GP to modify the audio data. The audio effects that are applied may include reverberation, distortion, echo, amplitude modulation, infinite impulse response of a second order (IIR2), chorus, and other conventional or custom audio effects. The modified audio data may be mixed with unmodified audio data from one or more VP mix bins, or the modified audio data may be temporarily stored directly in a GP mix bin. For example, the mixed vehicle noise data stored in VP FX send 19 VP mix bin 369 may be modified by one or more audio effects programs 380 and the resulting modified audio data then temporarily stored in a GP FX send 19 VP mix bin 379. Again, VP mix bins 360 and GP mix bins 370 preferably represent the same physical memory space. Thus, mixing, or other processing, simply modifies the audio data stored in a memory location associated with both sets of logical mix bins.

After each frame of processing, the DSP execution kernel of the GP initiates a DMA copy of the audio data from all of the GP mix bins to console RAM 206. The audio data are then accessible to the game that is executing on the CPU of the game console. To provide desired recursive multistage audio processing, the game instructs a software sound subsystem module 395 to route selected data from console RAM 206 back through the audio processing unit. The game may also instruct software subsystem module 395 to update selected parameters of one or more predetermined functions of the VP pipeline. For example, the developer may include instructions in the game to update a frequency parameter in a pitch shifting function of the VP pipeline that will cause a Doppler shift in the simulated vehicle noises as the simulated vehicle moves toward or away from a virtual position in the computer simulation. Alternatively, or in addition, the mixed noises of the simulated vehicle may be routed back through a voice N 356 and processed by a 3D audio positioning function. By mixing the noises before applying the 3D audio positioning function, a single set of 3D outputs is produced. This minimizes the number of mix bins required to store the 3D outputs. For instance, the 3D audio positioning function may produce outputs that are routed to front-left speaker mix bin 362, front-right speaker mix bin 363, back-left speaker mix bin 366, and back-right speaker mix bin 367. Those of ordinary skill in the art will recognize that the data stored in console RAM 206 may be used in relation to many other combinations of input and output routings.

Overall Process

Figure 6:
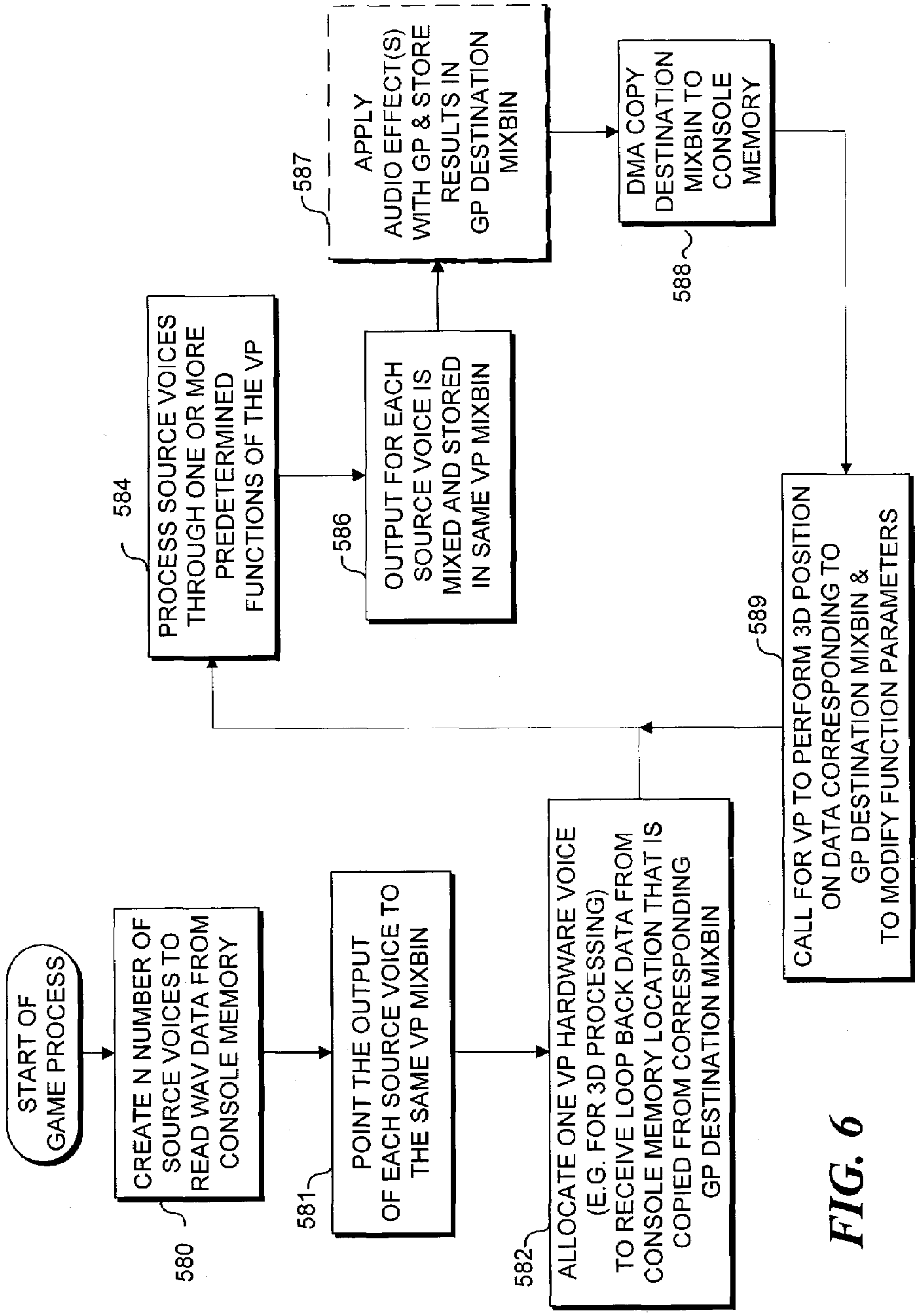
FIG. 6 is a flow diagram illustrating overall logic for processing multiple audio input data streams to produce 3D positioned audio data; and, FIG. 7 is a flow diagram illustrating logic for performing the 3D audio positioning.

FIG. 6 is a flow diagram illustrating overall logic for processing multiple audio input data streams to produce 3D positioned audio data. At the beginning of a computer simulation, at a change of scene, or at another change of audio content, the computer simulation begins an audio initialization process. Specifically, at a step 580, the computer simulation first establishes a number of source voices for the VP to process. For example, with reference to FIG. 5, the computer simulation establishes the audio data sources for selected VP voices 350, such as voice one 352, voice two 353, and voice three 355. The input of the source voices is read from console RAM. Each source voice reads a different audio data, such as different WAV files. At a step 581, the computer simulation specifies that once these voices are processed by selected predetermined functions of VP pipeline 332, each corresponding output should be mixed and stored in a single VP mix bin, such as VP effect send 19 mix bin 369. This single VP mix bin may provide input to a chain of audio effects to be processed by the GP. If no audio effects are to be applied by the GP, the single VP mix bin can also be considered the destination mix bin, because the VP mix bins and GP mix bins are preferably the same physical storage location.

The initialization process also includes instructing the audio processor to allocate a VP hardware voice, at a step 582, to receive loop back data from a console RAM location that corresponds to the destination mix bin. As indicated above, the GP and VP mix bins are preferably the same physical memory location in the audio processing unit, so the destination mix bin may correspond to the single VP mix bin storing the mixed output of the predefined functions of the VP pipeline. Preferably, however, the destination mix bin corresponds to a GP mix bin storing data that was produced by applying audio effects with the GP. For instance, the mix bin labeled effects send 19 379 in FIG. 5 may be allocated as the GP destination mix bin.

Once the initialization steps are complete, the data associated with the source voices are processed through the selected predetermined functions of the VP pipeline, at a step 584 of FIG. 6. As previously noted, the outputs for each source voice are mixed together and stored in a single VP mix bin, at a step 586. The source voices are preferably associated with the single VP mix bin by a linked list. Because the single VP mix bin and an associated GP mix bin preferably correspond to the same audio processor storage location, the outputs for each source voice are sometimes said to be associated with the destination mix bin by the linked list. Thus, if a source voice is stopped because no more source data are available, or because another change in the computer simulation has occurred, the stopped source voice is removed from the linked list. Conversely, a new source voice may be added to the linked list if the source voice is to be associated with the destination mix bin. In any case, processing the source voice data through the predetermined functions of the VP pipeline and outputting the results to a single VP mix bin corresponds to the first stage of processing.

If desired, the computer simulation may optionally apply one or more programmable audio effects with the GP, at a step 587. Processing by the GP may be considered a second stage. Whether processed by the GP or not, the desired data is still stored in the destination mix bin, since the VP and GP logical mix bins correspond to the same physical storage location. As indicated above, at each processing frame, a DSP execution kernel of the GP initiates a DMA transfer of the data in all the mix bins to the console RAM, at a step 588. Thus, on each successive processing frame, the computer simulation can call for the data in the console RAM to be processed back through another VP voice. For instance, step 589 illustrates that the computer simulation can call for the VP to perform 3D audio positioning for the data that were copied from the destination mix bin to the console RAM. The computer simulation may also adjust parameters of the predefined functions in the VP pipeline. Further details of step 589 are provided by FIG. 7.

Figure 7:
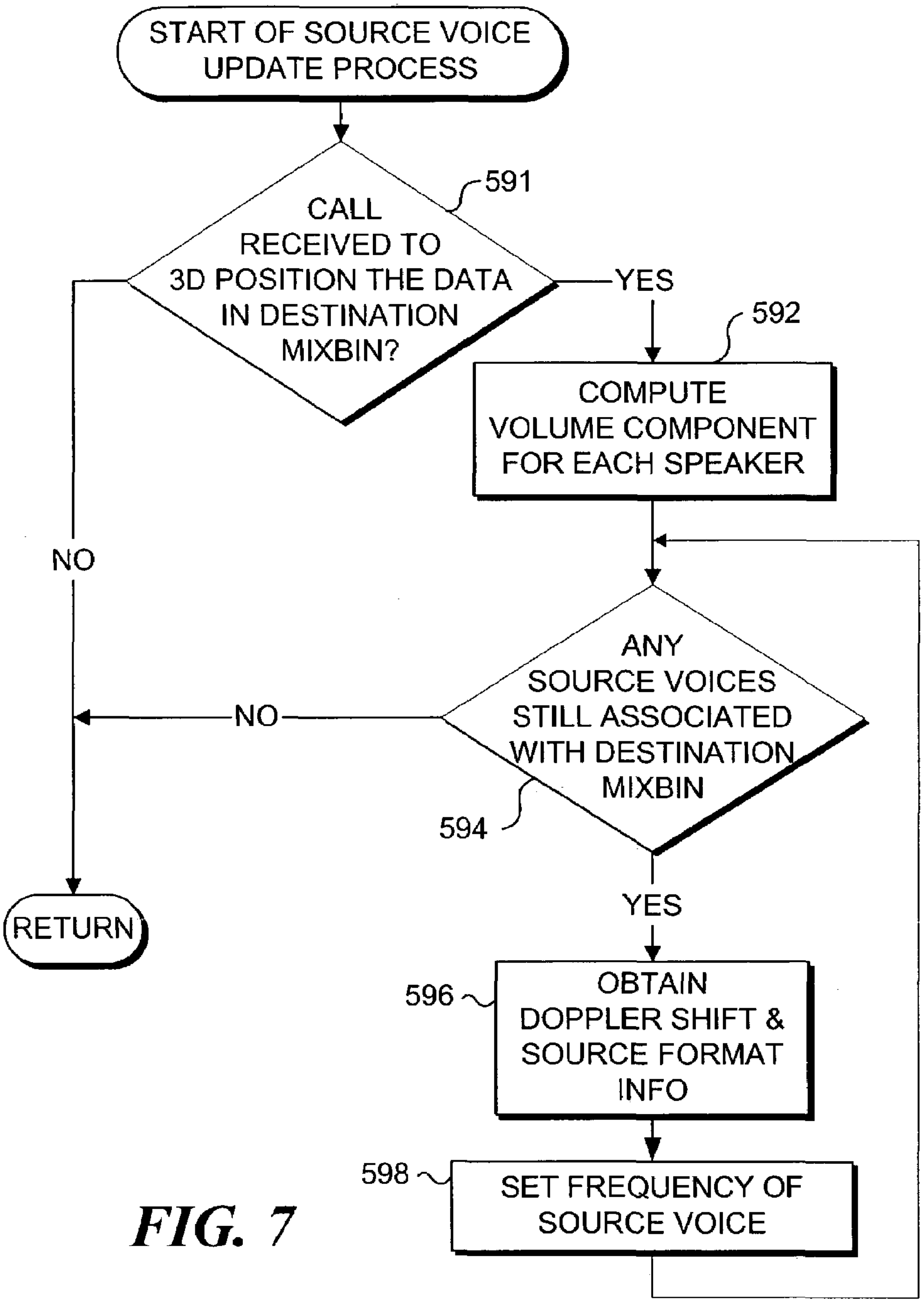

With regard to FIG. 7, the computer simulation instructs a sound processing program to call for the VP to perform the 3D audio positioning as one of the predetermined functions of the VP pipeline. For example, a computer game running on Microsoft Corporation's XBOX™ could call a sound processing program called Dsound. Thus, at a decision step 591, the sound processing program detects an instruction from the computer simulation to perform the 3D audio positioning. If a call is received, the sound processing program computes a volume component for each speaker, at a step 592, from the data that were copied from the destination mix bin to the console RAM. As is well known, different volume levels at each speaker provide cues that indicate a spatial position of a sound source.

It is also well known that the spatial motion of a sound source relative to a listener is indicated by a Doppler shift in the frequency of the sound heard by the listener. An efficient method of achieving a Doppler shift is to perform a time-variant frequency shift by sample rate conversion (SRC). This conversion is sometimes referred to as predetermined pitch shift function of the VP pipeline. However, the predetermined pitch shift function would have to be performed on each component of the data corresponding to each speaker, which is inefficient. If the predetermined pitch shift function was performed before the volume components were determined, the VP would still produce multiple components for a single source voice. If audio effects were to be applied, each of the multiple volume components would have to be processed through the GP. Moreover, if the simulation required multiple source voices to be mixed (such as for a point source), the individual components would have to be mixed and processed through the GP to apply audio effects. It is more efficient to first mix the source voices and apply the audio effects to the mixed data. Unfortunately, the VP can not simply reprocess the resulting data as part of a single 3D process that includes both the predetermined pitch shift function (the time-variant frequency shift by SRC) and a function to compute each of volume components. The GP operates at a fixed data rate (e.g., 48 kHz). To ensure that the GP continues to operate at its maximum efficiency, the VP should process the data from the destination mix bin and provide final volume components at the same data rate. If the data rate is less than expected by the GP, the GP will be starved of data, and unintentional silence may result. Conversely, if the data rate is greater than expected by the GP, some data will be overwritten before the GP can process the data. Performing the predetermined pitch shift (the time-variant frequency shift by SRC) on the mixed data from the destination mix bin would cause a change in data rate that could result in a starvation or overwriting condition.

To overcome this problem, a preferred embodiment performs frequency (Doppler) shifting on the source data from each of the individual source voices that are associated with the destination mix bin, rather than on the mixed data in the destination mix bin. Thus, at a decision step 594, the sound processing program determines whether any source voices are still associated with the destination mix bin, or whether the source voices are no longer associated with the destination mix bin, because no more source data is available or because another change in the computer simulation has occurred. If at least one source voice is still associated with the destination mix bin, the sound processing program obtains information needed for Doppler shifting at a step 596. For instance, the sound processing program may obtain velocity information and the format of the source audio data. As a function of this information, the sound processing program sets the frequency for each source voice that is still associated with the destination mix bin, at a step 598. The predetermined pitch shift function of the VP pipeline will then process the data from the associated source voices at the new frequency settings.

Controlling each individual source voice while also controlling a mixture of the sounds further enables the sound processing system to transition between the multiple individual sounds and a point source sound. For example, the sound processing system can increase the volume of the mixed vehicle sounds as the vehicle moves further from a virtual listener position in the computer simulation. Correspondingly, the sound processing system will then decrease the volume of each individual sound. Conversely, as the vehicle moves closer to the virtual listener, and as the virtual listener enters the vehicle, the sound processing system can decrease the mixed point source sound, and increase the individual sounds, so that the separate sources are clearly distinguished, in different speakers.

Although the present invention has been described in connection with the preferred form of practicing it, those of ordinary skill in the art will understand that many modifications can be made thereto within the scope of the claims that follow. Accordingly, it is not intended that the scope of the invention in any way be limited by the above description, but instead be determined entirely by reference to the claims that follow.

The invention in which an exclusive right is claimed is defined by the following:

1. A method for recursive audio processing using a multistage processor of a computing device, comprising the steps of:

(a) processing first input data with a first predetermined function of a first stage of the multistage processor, to produce an intermediate output;

(b) storing the intermediate output in a location that is accessible to a second stage of the multistage processor;

(c) processing the intermediate output with the second stage to produce a second stage output;

(d) storing the second stage output in a destination location that is accessible to a second predetermined function of the first stage of the multistage processor; and (e) processing the second stage output with the second predetermined function of the first stage of the multistage processor, producing at least one output audio signal.

2. The method of claim 1, wherein the first predetermined function of the first stage is a prerequisite to the second predetermined function of the first stage of the secondary processor.

3. The method of claim 1, wherein the intermediate output has a first intermediate output component, further comprising the steps of:

(a) processing second input data with the first predetermined function of the first stage of the multistage processor, to produce a second intermediate output component; and (b) mixing the second intermediate output component with the first intermediate output component to produce the intermediate output stored in the location that is accessible to the second stage of the multistage processor.

4. The method of claim 3, further comprising the step of modifying a parameter of the first predetermined function after processing the first input data and the second input data with the first predetermined function.

5. The method of claim 1, wherein the first predefined function comprises at least one of a frequency shifting function, a sample rate conversion function, an enveloping function, and a filtering function.

6. The method of claim 1, wherein the second predefined function comprises a three-dimensional audio spatialization function.

7. The method of claim 1, wherein the second stage operation comprises at least one of a null operation, a reverberation audio effect, an infinite impulse response audio effect, a chorus audio effect, and a flange audio effect.

8. The method of claim 1, wherein the step of storing the second stage output comprises the steps of:

(a) storing the second stage output in a destination mix bin that is dedicated to the multistage processor;

(b) transferring the second stage output to a portion of console system memory that is accessible to a primary processor of the game console and is accessible to the multistage processor; and (c) associating the second predetermined function of the first stage of the multistage processor with the second stage output that was transferred to the console system memory.

9. The method of claim 1, wherein the multistage processor comprises at least one digital signal processor.

10. The method of claim 1, further comprising the step of driving at least one sound transducer with said at least one output audio signal.

11. A memory medium having machine instructions stored thereon for carrying out the steps of claim 1.

12. A computing device in which recursive processing is employed to produce at least one audio output signal, comprising:

(a) a primary processor;

(b) a multistage processor that is substantially independent of the primary processor, said multistage processor being programmed with machine instructions stored in a secondary memory for carrying out a plurality of functions for processing audio data;

(c) a sound transducer that is coupled in communication with the primary processor; and (d) a primary memory in communication with the multistage processor and with the primary processor and shared by both, said primary memory storing machine instructions that cause the primary processor to carry out a plurality of functions in regard to the audio data that are distinct from the plurality of functions carried out in regard to the audio data by the multistage processor, wherein the plurality of functions carried out by the primary processor and the secondary processor include:

(i) processing first input data with a first predetermined function of a first stage of the multistage processor, to produce an intermediate output;

(ii) storing the intermediate output in a location that is accessible to a second stage of the multistage processor;

(iii) processing the intermediate output with the second stage to produce a second stage output;

(iv) storing the second stage output in a destination location that is accessible to a second predetermined function of the first stage of the multistage processor; and (v) processing the second stage output with the second predetermined function of the first stage of the multistage processor, producing at least one output audio signal.

13. The system of claim 12, wherein the first predetermined function of the first stage is a prerequisite to the second predetermined function of the first stage of the secondary processor.

14. The system of claim 12, wherein the intermediate output has a first intermediate output component, and wherein the plurality of functions carried out by the primary processor and the secondary processor further include:

(a) processing second input data with the first predetermined function of the first stage of the multistage processor, to produce a second intermediate output component; and (b) mixing the second intermediate output component with the first intermediate output component to produce the intermediate output stored in the location that is accessible to the second stage of the multistage processor.

15. The system of claim 14, wherein the plurality of functions carried out by the primary processor and the secondary processor further include modifying a parameter of the first predetermined function after processing the first input data and the second input data with the first predetermined function.

16. The system of claim 12, wherein the first predefined function comprises at least one of a frequency shifting function, a sample rate conversion function, an enveloping function, and a filtering function.

17. The system of claim 12, wherein the second predefined function comprises a three-dimensional audio spatialization function.

18. The system of claim 12, wherein the plurality of functions carried out by the primary processor and the secondary processor further include:

(a) storing the second stage output in a destination mix bin that is dedicated to the multistage processor;

(b) transferring the second stage output to a portion of console system memory that is accessible to a primary processor of the game console and is accessible to the multistage processor; and (c) associating the second predetermined function of the first stage of the multistage processor with the second stage output that was transferred to the console system memory.

19. The system of claim 12, wherein the multistage processor comprises at least one digital signal processor.

20. The system of claim 12, wherein the plurality of functions carried out by the primary processor and the secondary processor further include driving at least one sound transducer with said at least one output audio signal.

* * * * *